United States Patent [19]

Hsu

[11] Patent Number: 5,706,426
[45] Date of Patent: Jan. 6, 1998

[54] SOFTWARE PROTECTION METHOD AND APPARATUS

[75] Inventor: Jerry Hsu, Tainan, Taiwan

[73] Assignee: United Microelectronics Corporation, Hsinchu, Taiwan

[21] Appl. No.: 597,873

[22] Filed: Feb. 7, 1996

[51] Int. Cl.$^6$ .................................................. G06F 13/00
[52] U.S. Cl. ................................................ 395/186; 380/25
[58] Field of Search .............................. 395/186, 187.01, 395/188.01; 380/4, 24, 25

[56] References Cited

U.S. PATENT DOCUMENTS

| 4,002,956 | 1/1977 | Minor et al. | 317/154 |
| 4,604,708 | 8/1986 | Lewis | 364/900 |
| 5,592,619 | 1/1997 | Shona | 395/186 |
| 5,628,015 | 5/1997 | Singh | 395/186 |

OTHER PUBLICATIONS

Daniel Sternglass, "The Future is in the PC Cards," Databook Inc., Nov. 1992, pp. 46–50.
Lim et al., "Smart card reader," IEEE, Nov. 2, 1992, pp. 6–11.

Primary Examiner—Robert W. Beausoliel, Jr.
Assistant Examiner—Norman M. Wright
Attorney, Agent, or Firm—Barnes, Kisselle, Raisch, Choate, Whittemore & Hulbert, P.C.

[57] ABSTRACT

An apparatus for use in a computer software protection system includes a protection device and a key externally connected thereto. The key includes a resistor and capacitor connected in series. The protection device includes an I/O port connected to the key such that a charge on the capacitor corresponds to a voltage on the I/O port. The I/O port is connected, selectively to ground by an NMOS switch, which is controlled by a control signal from a control program executing on a main game machine. The protection device further includes a voltage comparator having an input connected to the I/O port, and an output connected to an I/O interface that interfaces the protection device to the game console. In operation, the control program determines whether the key has a valid charging characteristic, as determined by the selection of the resistor and capacitor. While the control signal is unasserted, the NMOS switch is off, and the capacitors fully charged through the resistor. The control program temporarily switches on the NMOS switch to discharge the capacitor, upon which time control program discontinues the control signal. The voltage comparator then monitors the subsequent charging of the capacitor through the resistor. When a threshold voltage is reached, its output changes state. The program reads the charging time through the I/O interface, and uses the charging time as the basis for executed the protected computer software.

15 Claims, 4 Drawing Sheets

SOFTWARE PROTECTION METHOD AND APPARATUS

FIELD OF THE INVENTION

The present invention generally relates to a method and apparatus for protecting software and more particularly, relates to a method and apparatus utilizing an I/O port connected it to an external resistor/capacitor network such that a charging/discharging time associated therewith is used as a key for the software protection.

BACKGROUND OF THE INVENTION

Television video games presently available in the marketplace include two major parts: i.e., the game console and the game cartridge. The software cartridges are most often of the interchangeable kind, in other words, after the consumer has decided on a game console, he can then select a game cartridge to his liking from the many available.

The software program and data on a cartridge is normally stored in an integrated circuit (IC) memory device. The memory device may be selected from one of the many types available, including a read only memory (Mask ROM), an erasable memory device (EPROM or EEPROM), or a one-time programmable memory device (OTP). The program and data from these memory devices must be delivered to the CPU of the game console in order to execute the program. Since the program and data must be delivered by the busses on the main machine, these programs and data can easily be read by unscrupulous merchants in order to counterfeit the programs and data and subsequently make illegal sales. Since these IC memory devices are standard products, the retrieved programs and data can be easily counterfeited.

The software programs contained in the above described memory devices can also be easily counterfeited. The copyright holders of such software, therefore, are engaged in designing various methods and apparatus to prevent illegal use or counterfeiting of such software programs. For instance, in a Nintendo's NES and Super NES, a microprocessor is used as a protection device. The microprocessor is installed in the game console and in the cartridge, and, after the game console is turned on, the protective devices will communicate with each other. If predetermined data do not match, the microprocessor will stop the game console from executing the protected program, or, alternatively, stop the program data on the cartridge from being sent out. However, this protective method can be easily defeated by duplicating such a protection device (the IC), even if such duplication requires a substantial amount of effort. Additionally, since these type of protective IC's can also be used in connection with other software titles, such economies of scale encourages counterfeiters in making the substantial investment in duplicating the protective IC, and then mass producing the counterfeited product to recover the investment. Once the protective device is disabled, all the software programs using this device are no longer protected. In some instances, as long as the function of stopping computer execution is disabled, a counterfeiter may not even require the counterfeiting of such protection devices in order to achieve their illegal purpose.

In other TV game cartridges, such as those by Sega and those used in a Nintendo Gameboy, a cryptic code is added to the memory device of the cartridge. When the game console is turned on, the operating program (BIOS) will inspect the cryptic code in the cartridge memory to determine its validity, and thus whether to permit use. However, this type of anti-counterfeiting methods are still not effective to protect software programs from being counterfeited.

In another example, the PC Engine by NEC, a memory IC on the cartridge is manufactured by a special process: i.e., a read-only memory that has a faster access speed. These devices were effective when they first debuted on the market. However, with the advance in semiconductor technology, a high speed, read-only memory is no longer a difficult technology to manufacture. Therefore, the protective function previously performed by these types of devices is no longer present.

Similar to the protection scheme discussed-above relative to dedicated game machines, there are numerous protection methods for protecting software in personal computers ranging from an Apple to an IBM PC. These protection methods can be, for simplicity sake, as follows.

One approach relates to a property of magnetic disks insofar as a magnetic disk can be given special processing such that it cannot be easily duplicated. For instance, well known in PCs, weak magnetic area protection and seamless lock can be used. The advantages of these methods are that they can be easily manufactured at a low cost. Furthermore, the data protected is stored on the magnetic disk is such that no additional cost for any additional hardware is necessary. The main disadvantage of this method lies in the fact that it can be easily defeated. Furthermore, a magnetic disk can be easily damaged. Moreover, the speed of reading data from these disks is relatively slow. These significant disadvantages make the utilization of this protective method unpopular.

A second approach for personal computers involves a plug-in-type (Key Card) software protection. It uses a protection device in a special interface card plugged in an available slot on a motherboard, from which predetermined data is read. The advantage of this approach is that the card cannot be easily duplicated and, further, that the write-in/read-out speed is higher. A great number of inspections can be performed during program execution thus, increasing the difficulty in devising a way to defeat its function. In order to install the interface card, however, the main machine must be disassembled, which is very inconvenient. This inconvenience is the major drawback of this approach. Furthermore, it may also cause incompatibility with different machines since there may not be a sufficient number of expansion slots to allow installation. This would be particularly true in the case of a notebook computer.

A more modern protection device is a "dongle", such as the HASP made by Aladdin Security, and the Centinel made by Rainbow technologies. They are intended to protect the software from unauthorized usage and from theft and function similar to the Key Cards. The dongle can be considered a special format of the Key Card, except that it is connected to the printer (parallel) port, which is utilized by programs to read the dongle protection device through this port to determine whether the software is being used legally. The principle behind the operation of the dongle relates to the writing of a cryptic code into the dongle and then, when the software is executed, in reading the data out of the dongle through the port, to determine whether there is a dongle, or whether there is authorized usage, or any restrictions on usage, and whether to continue execution of the program. The dongles available in the market are made by utilizing a serial EEPROM IC of the 93C46 type.

The advantage of these devices is that they can be easily installed. They are much easier to use compared to the above described Keycards method where the PC must be disassembled to insert an interface card into the motherboard. Further, since most game machines are equipped with an external slot for changing cartridge, the dongle and Keycard are almost the same. However, since it is necessary to store a cryptic code in the protection device, it must be equipped with a memory device, and the memory device must be a non-volatile memory device such as an EEPROM. The manufacturing process of such IC is rather expensive. The cost of a protection device is therefore relatively high. This makes them unsuitable for low priced software and for mass produced and low priced products such as TV games. Only special software having a higher price can warrant utilizing these types of protection devices such as CAD software.

Another drawback of this solution is that a dongle can be easily purchased and, as long as a data on the dongle is read the data can be rewritten into another purchased dongle, so the dongle can be duplicated. Some of the dongles utilize standard ICs (94C46) which can be obtained from many manufacturers such that a dongle can be made by a counterfeiter himself.

It is highly impractical to design a software protection device that cannot eventually be defeated. The purpose therefore is to devise a protection device of such a kind that, for a potential counterfeiter, there would be no incentive to solve the problem and/or the counterfeit product itself would be of a very high cost. If these objectives can be met, then a practical software protection scheme can thus be achieved. One of the best methods to accomplish these ends is to make a special purpose IC, rather than using a standard IC. Without this special purpose IC, even a successfully copied cartridge still cannot be utilized unless the counterfeiter can also obtain or counterfeit the special purpose IC. Since special purpose ICs can be tightly controlled by the manufacturers, and the manufacturing cost of such ICs is very high, access to the protective IC will pose major problems to counterfeiters. Further, the Keycard and dongle appear to be more difficult to be duplicated, since they require using a special technology in semiconductor manufacturing.

It is therefore an object of the present invention to provide a method and an apparatus for protecting computer software that does not have the drawbacks of prior art protection methods and related apparatus.

It is another object of the present invention to provide a method and apparatus for protecting computer software by using an I/O port and externally connected resistor and capacitor.

It is a further object of the present invention to provide a method and apparatus for protecting computer software by using the charging/discharging time of a resistor and capacitor as the key for protecting the software.

SUMMARY OF THE INVENTION

Special purpose hardware, when used in a software protection scheme, provides significant advantages over other approaches, including relatively high difficulty in duplication, without an unreasonably high cost. Accordingly, in one aspect of the present invention, an apparatus for use in a computer software protection system is provided, which includes a key and a protection device. The key is characterized as having associated therewith a preselected one of a large number of charging and discharging characteristics. The protection device is coupled to the key and is responsive to a control signal from a program for electrically stimulating the key, and for detecting the preselected charging and discharging characteristic in response thereto. The protection device then generates a signal that is indicative of the detected characteristic and is operative to pass the generated characteristic indicative signal to the program. The program then disables use or duplication of the protected computer software, using the characteristic indicative signal, in accordance with predetermined criteria.

In a preferred embodiment, the key includes a resistor and a capacitor connected in series, where the resistor and capacitor each have values selected in accordance with the preselected charging and discharging characteristic of the key itself. Since a variety of combinations of resistors and capacitors can be provided, a correspondingly large variety of different keys for the computer software protection system can be made available for use. Further in the preferred embodiment, the protection device includes an I/O port, a switching device, a detection device, and an interface means.

The I/O port is coupled to the key such that a charge on the capacitor corresponds to the voltage of the I/O port. The switching device is controlled by a control signal and is further coupled to the I/O port. The switching device in this embodiment connects the I/O port to ground to discharge the capacitor when activated by the control signal, and, when deactivated by the control signal, disconnects the I/O port from ground to permit charging of the capacitor.

The detection device includes an input coupled to the I/O port for detecting the I/O port voltage and for generating in response thereto the characteristic indicative signal. The interface means is provided for coupling the system bus from the CPU to control the switching device, and for passing the generated characteristic indicative signal to the program. The characteristic indicative signal is a digital signal having a pulse with a width (i.e., duration) that corresponds to the preselected charging and discharging characteristic of the key.

In a second embodiment, the key includes a resistor and capacitor connected in parallel. Due to this particular circuit arrangement, the characteristic indicative signal of the key corresponds to a charging time of the capacitor.

In a third embodiment, the key includes a resistor and a capacitor connected in series; however, the switching device is a PMOS device that couples the I/O port to a power source. In this embodiment, the characteristic indicative signal of the key corresponds to a discharging time of the capacitor.

In a fourth embodiment, the key includes a resistor and a capacitor connected in parallel, and includes a switching device that couples the I/O port to a power source. In this embodiment, the characteristic indicative signal of the key corresponds to a discharging time of the capacitor.

In another aspect of the present invention, a system for protecting computer software is provided, which includes a microprocessor configured to execute a control program, wherein the program includes means for generating a control signal. The system further includes the inventive apparatus described above, wherein the program also includes means for disabling use of the protective software using the characteristic indicative signal, in accordance with predetermined criteria.

In yet another aspect of the present invention, a method of protecting computer software in a system of the type including a key having a capacitor with an initial charge associated therewith, and a protection device having a switch coupled to the key, is provided. The inventive method includes four basic steps. The first step includes altering the charge on the capacitor from the initial amount to a second amount by turning on the switch. The second step includes altering the charge on the capacitor from the second amount towards the initial amount by turning off the switch. The third step includes determining a time for the charge on the capacitor to reach a predetermined threshold level wherein the predetermined threshold level has a value intermediate the initial amount and a second amount. Finally, the fourth step includes disabling use of the protective software using the time determined in the third step in accordance with predetermined criteria.

These and other features and objects of this invention will become apparent to one skilled in the art from the following detailed description and the accompanying drawings illustrating features of the invention by way of example.

DETAILED DESCRIPTION OF THE PREFERRED EMBODIMENT

Figure 1:
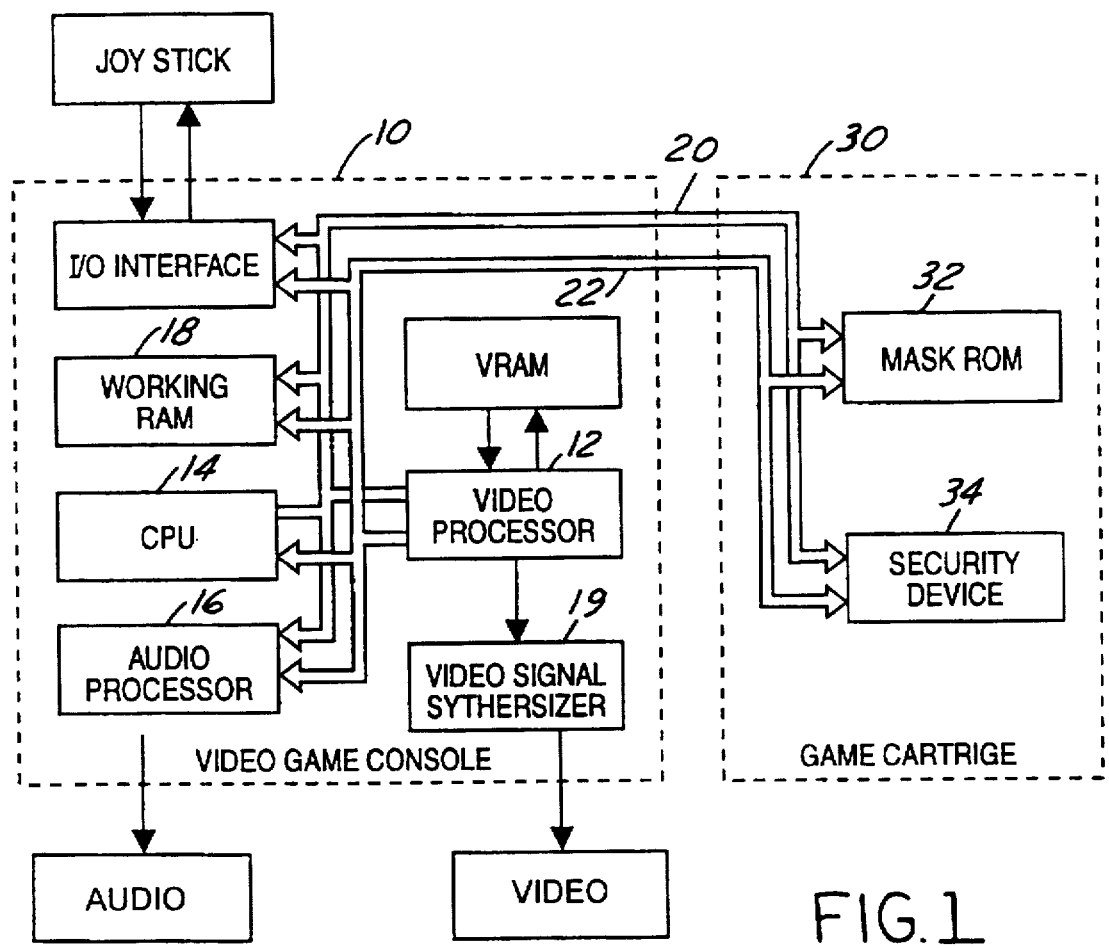
FIG. 1 is a block diagram view depicting a conventional dedicated computer game system.

Referring now to the drawing wherein like reference numerals are used to refer to identical components in the various views, FIG. 1 is a block diagram view of a conventional dedicated video game system. The system include two major parts: (1) a main machine 10 including a VIDEO processor 12, a central processing unit (CPU) 14, an AUDIO processor 16, a memory 18, and a VIDEO signal synthesizer 19, which is connected by address bus 20 and data bus 22 to a (2) game cartridge 30, which includes a mask ROM memory 32, and, optionally, a security device 34. The memory 32 is conventionally a mask read only memory (ROM) device.

Figure 2:
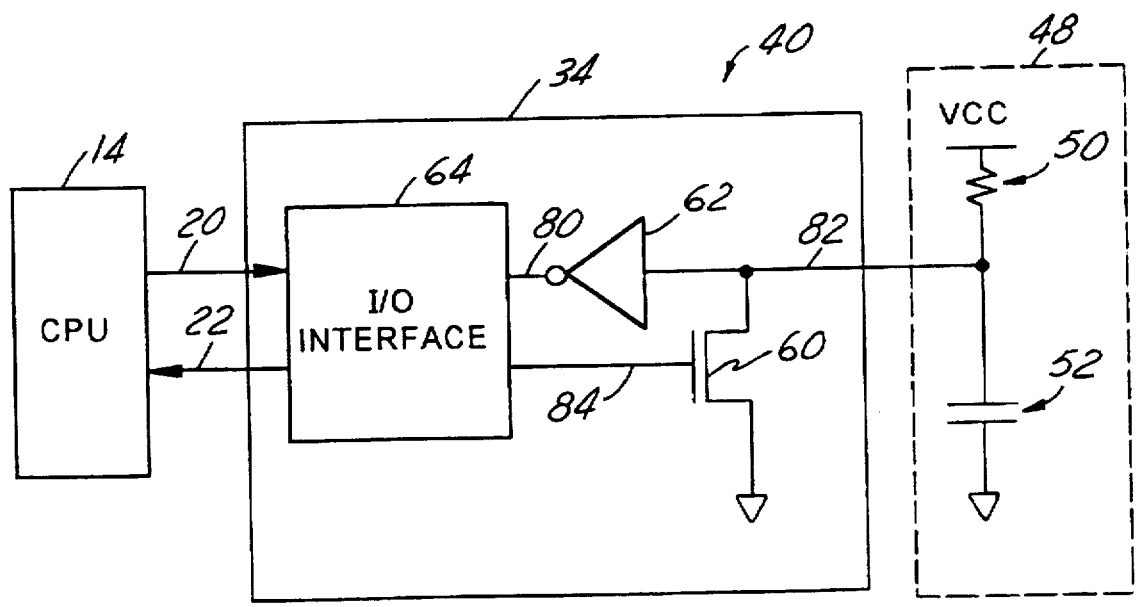
FIG. 2 is a partial schematic and block diagram view illustrating a preferred embodiment of the present invention.

FIG. 2 shows an apparatus 40 for use in a computer software protection system. Apparatus 40, a preferred embodiment of the present invention, includes protection device 34, and key 48, which includes resistor 50, and capacitor 52 connected in series, to thereby define a preselected one of a plurality of charging and discharging characteristics, based on the values selected for resistor 50 and capacitor 52.

Figure 2A:
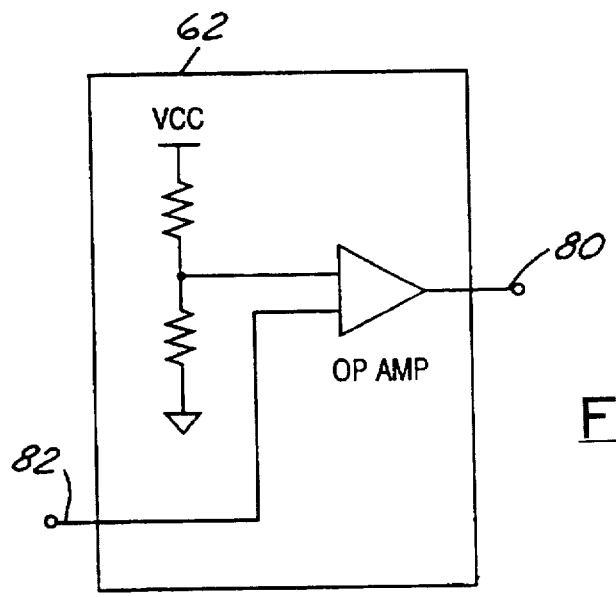
FIG. 2A is a block diagram of a protection device.

Protection device 34 is provided for electrically stimulating key 48, for detecting the preselected charging and discharging characteristic in response thereto and for generating a signal indicative of the detected characteristic. Protection device 34 includes switching device 60, preferably NMOS device 60, detection device 62, I/O interface means 64, signal 80 indicative of the preselected charging and discharging characteristic of key 48, I/O port 82, and control signal 84. The protection device 62 is shown in more detail in FIG. 2A.

Before preceding to a detailed description of the inventive apparatus 40, a general description of the protective mechanism established by apparatus 40 will be set forth. As shown in FIG. 2, the basic arrangement comprises CPU 14 connected by way of address bus 20, and data bus 22 to protection device 34. Key 48 is externally connected, through I/O port 82, to protection device 34. Based on values selected for resistor 50, and capacitor 52, key 48 takes on a preselected one of plurality of charging and discharging characteristics. Since there is an unlimited number of combinations of resistors and capacitors, an unlimited number of charging/discharging characteristics (i.e., "keys") for protecting computer software can be provided. CPU 14 is configured to execute therewith. The program includes a means for generating a control signal, which is operative to electrically excite or stimulate key 48. CPU 14, through the control program, further includes means for disabling use (i.e., prohibiting play of the game) by the protective software in accordance with predetermined criteria. The predetermined criteria may include a parameter having a value corresponding to the preselected charging and discharging characteristic of key 48. Thus, after protection device 34 stimulates key 48 by assertion of signal over the data and address buses, protection device 34 detects the charging and discharging characteristic of key 48, and then generates a signal indicative of the detected characteristic, and then passes the generated characteristic indicative signal to CPU 14 over the address and data buses. The program, using the characteristic indicative signal, in accordance with predetermined criteria, selectively disables use of the protected computer software. Thus an unauthorized user is prohibited from playing the game. If the unauthorized user does not have the proper key, he would not be able to use the software, i.e., the software would not function properly.

It should be appreciated that the foregoing general description may be implemented in several different ways, based in part, on whether the protection to be established relates to a dedicated game console/cartridge system, as shown in FIG. 1, or, alternatively, the protection being established by the present invention relates to the software on a general purpose computer. With respect to the dedicated game console/cartridge-type game system shown in FIG. 1, the game software and associated data being protected is initially stored in memory 32. The control program in a system of this type may be either part of the game software/ data being protected and stored in memory 32.

The memory 18 is a memory for storing the game parameters (e.g., position, fighting strength, character type, etc.). The memory 32 is mask ROM for storing the game title information (e.g., program & date). With respect to a general purpose computer (e.g., IBM PC) the configuration depicted in FIGS. 1 and 2 would be modified slightly, wherein the control program would likely be on the same magnetic diskette or the like as the computer software/data to be protected, and further communication with apparatus 40, including externally connected key 48, may occur through, for example, a parallel port (e.g., printer port), or a serial port.

Referring to FIG. 2, NMOS 60 is responsive to control signal 84 and is coupled to I/O port 82 for connecting I/O port 82 to a ground node to discharge capacitor 52, and for disconnecting I/O port 82 from ground to permit charging of capacitor 52.

Voltage comparator 62 includes an input coupled to I/O port 82 and is provided for detecting the voltage of port 82 and generating in response thereto a signal indicative of the charging/discharging characteristic of key 48. Comparator 62 is well-known in the art, and provides an output which is the complement of the input when the voltage on the input exceeds respective positive-going and negative-going predetermined threshold voltages. I/O interface means 64 is provide for interfacing or connecting to CPU 14 such that NMOS 60 can be controlled by the control program being executed on CPU 14 over buses 20, 22 and via control signal 84, and also such that the charging/discharging characteristic indicative signal 80 can be read by the program.

The I/O interface 64 can include a counter/timer to determine the charging or discharging time. However, such a counter/time is not a must since the program can provide such a function. I/O port 82, as shown in FIG. 2, is coupled to key 48 such that a charge on capacitor 52 corresponds to the voltage of I/O paired.

Figure 6A:
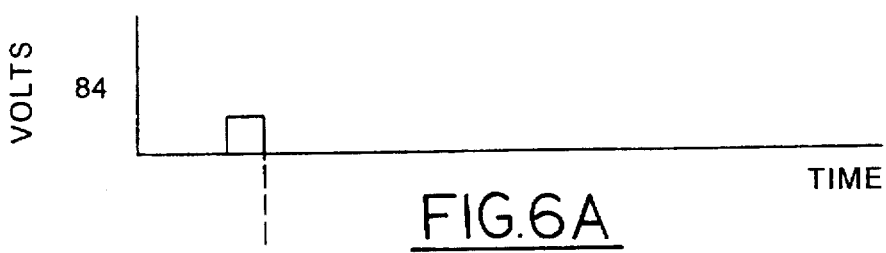
FIG. 6A is a simplified voltage versus time graph of a control signal 84 associated with the embodiments depicted in FIGS. 2 and 3.
Figure 6B:
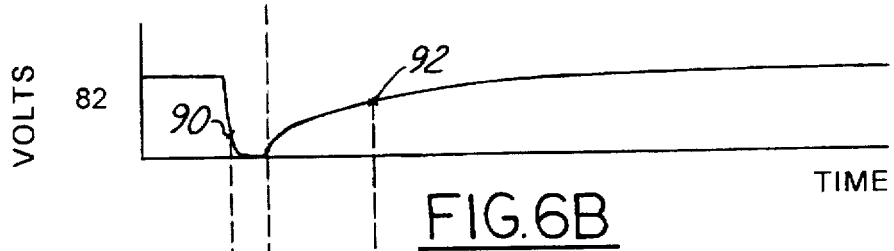
FIG. 6B is a simplified voltage versus time graph illustrating the voltage waveform of an I/O port of the embodiments depicted in FIGS. 2 and 3.

Referring now to FIGS. 2, 6A, 6B, and 6C, the operation of the embodiment of FIG. 2 is as follows. Assume that initially, NMOS 60 is off, as shown in FIG. 6A. After Vcc has stabilized, capacitor 52 is charged to approximately Vcc through resistor 50. The voltage across capacitor 52, which corresponds directly to the voltage of I/O port 82, is shown in FIGS. 6B prior to turning NMOS 60 on. The control program executing in CPU 14, at a predetermined time, across address bus 20, data bus 22, and through I/O interface 64, asserts control signal 84 to activate NMOS switch 60. Activation of control signal 84 is shown in FIG. 6A.

Figure 6C:
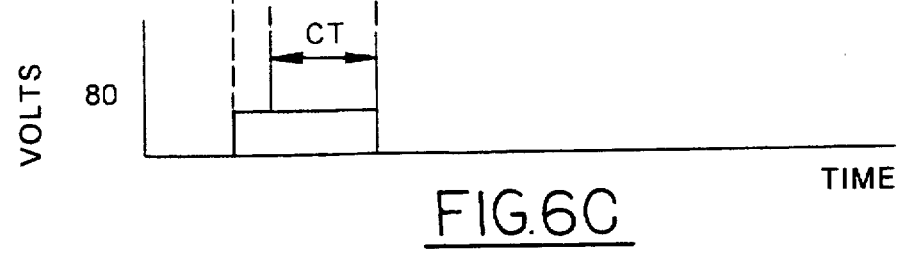
FIG. 6C is a simplified voltage versus time graph illustrating a characteristic indicative signal associated with the embodiments depicted in FIGS. 2 and 3.

After NMOS switch 60 transitions into a conductive state, capacitor 52 is quickly discharged through switch 60, wherein the voltage of I/O port 82 also quickly decreases. At a predetermined negative-going voltage threshold 90, comparator 62 will invert its input, as shown in FIG. 6C. After a preselected time (selected to ensure complete discharge of key 48), NMOS switch 60 is deactivated by the control program executing on CPU 14 by discontinuing control signal 84. After NMOS switch 60 transitions to a non-conductive state, capacitor 52 of key 48 immediately begins to be charged through resistor 50.

When sufficient charge accumulates on capacitor 52 so that the I/O port 82 voltage reaches the predetermined positive-going voltage threshold level 92, comparator 62 inverts its input, as shown in FIG. 6C. The control program, through I/O interface 64, reads the state of I/O port 82 by reading signal 80. As shown in FIG. 6C, characteristic indicative signal is a digital signal having a pulse with a width (i.e., duration), which corresponds to the charging/ discharging characteristic of the key 48. The control program then calculates the time required for the charging of capacitor 52, indicated as CT (charging time) in FIG. 6C. The control program then uses the charging time as a basis for executing the protected computer software program/data.

For example, one method of using the charging time will be described. As discussed above, one predetermined criteria associated with the control program includes a preselected charging parameter having a value corresponding to the preselected charging characteristic of key 48. The control program would then compare the time CT determined through protection device 34 with the preselecting charging parameter, and then disable use of the protected computer software when the determined charging time CT is outside a preselected range of the preselected charging parameter (i.e., the "key" does not match). It should be appreciated that there are a plurality of other control methods that may be devised and employed that provide substantially the same results by performing substantially the same function in substantially the same way without departing from the spirit and scope of this invention.

For example, the charging time can be used to terminate the program execution to cause the program to hang. The charging time can be used to interfere with the system bus making the program data erroneous, thus hanging the program execution.

Figure 3:
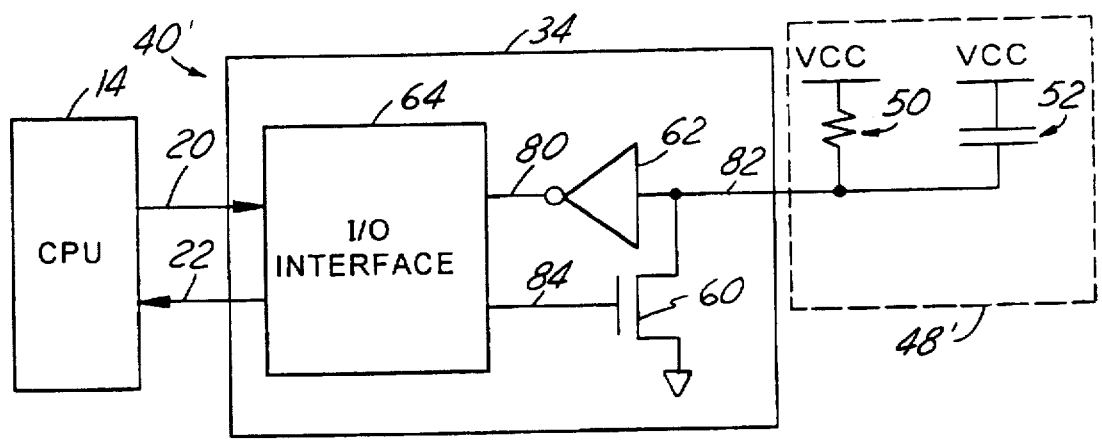
FIG. 3 is a partial schematic and block diagram view depicting a second embodiment of the present invention.

Referring now to FIG. 3, a second embodiment 40' of the present invention employing key 48', having a capacitor 52 connected in parallel with resistor 50, is shown. Operation of this embodiment is illustrated in FIGS. 6A, 6B, and 6C, and is identical to the description provided above in connection with the apparatus 40 shown in FIG. 2 except for the following. In the second embodiment, the NMOS switch 60, when placed in a conductive state by assertion of control signal 64, connects I/O port 82 to ground to charge capacitor 52, and, when placed in a non-conductive state by discontinuing application of control signal 84, for disconnecting I/O port 62 from ground to permit charging of capacitor 52. Although the voltage of I/O port 82 for apparatus 40' follows the same general waveform as for the embodiment shown in FIG. 2. The theory of operation of apparatus 40 particularly key 48 should be obvious to one of ordinary skill in the art. Thus, in the second embodiment, apparatus 40, the characteristic indicative signal of key 48 (i.e., signal 80), corresponds to a charging time of capacitor 52, through resistor 50, for the I/O port 82 voltage to reach the predetermined threshold voltage 92.

Figure 4:
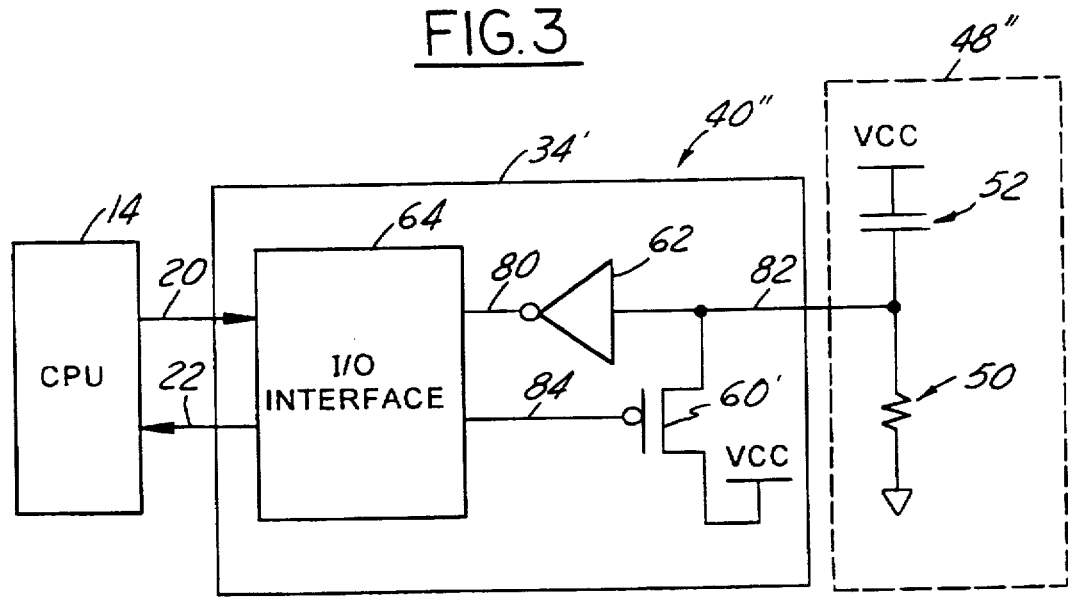
FIG. 4 is a partial schematic and block diagram view depicting a third embodiment of the present invention in which the voltage selectively connected to the I/O port is reversed relative to the embodiments shown in FIGS. 2 and 3.
Figure 7A:
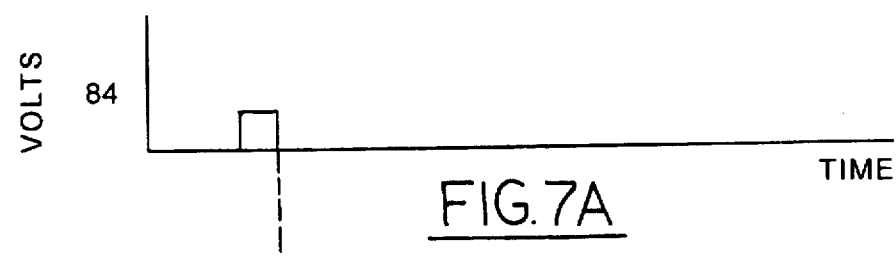
FIG. 7A is a simplified voltage versus time graph of a control signal 84 associated with the embodiments depicted in FIGS. 4 and 5.
Figure 7B:
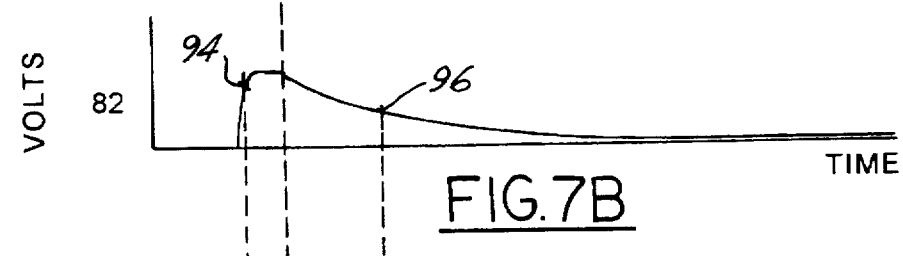
FIG. 7B is a simplified voltage versus time graph illustrating the voltage waveform of an I/O port associated with the embodiments depicted in FIGS. 4 and 5.
Figure 7C:
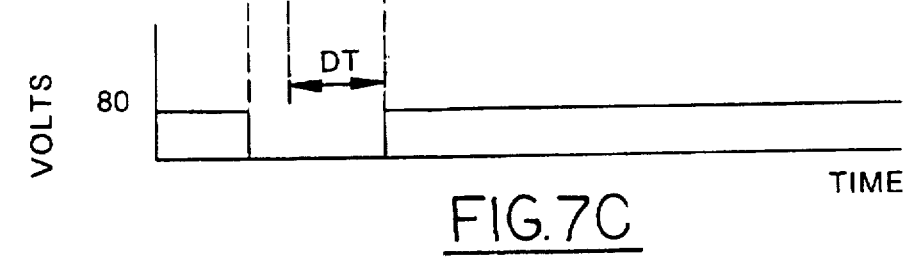
FIG. 7C is a simplified voltage versus time graph illustrating a characteristic indicative signal associated with the embodiments depicted in FIGS. 4 and 5.

FIG. 4 shows a third embodiment of the present invention, apparatus 40", including a protection device 34, and key 48. The basic function of protection device 34, and key 48 are identical to that described above. The structural difference in protection device 34 relates to switching device 60 which preferably is a PMOS switch 60. Key 48" includes a resistor 50, and a capacitor 52 connected in series. The operation of apparatus 40 is identical to the description of the embodiment shown in FIG. 2 with the following difference. Referring now to FIGS. 7A, 7B, and 7C, while the control program initially maintains control signal 84 in an off state, PMOS switch 60 is in a non-conductive state. Thus, capacitor 52 is fully discharged through resistor 50, therein bringing the voltage of I/O port 82 to ground. When control signal 84 is asserted at a predetermined time, PMOS switch 60 is placed in a conductive state, thus connecting I/O port 82 to a power source Vcc. This configuration causes capacitor 52 to quickly charge through PMOS switch 60. As shown in FIG. 7B, as capacitor charges, the voltage appearing on I/O port 82 quickly rises. When I/O port voltage 82 reaches a predetermined threshold level 94, comparator 62 changes state, as shown in FIG. 7C. After a predetermined time, control signal 84 is discontinued, thus placing PMOS switch 60' in a non-conductive state. Capacitor 52 immediately begins to be discharged through resistor 50. Due to the particular circuit arrangement shown in FIG. 4, the discharging of capacitor 52 results in corresponding decrease in the voltage appearing on I/O port 82, as shown in FIG. 7B. When the decrease in voltage reaches negative-going predetermined threshold level 96, comparator 62 changes state, as shown in FIG. 7C. Thus, for apparatus 40" shown in FIG. 4, the characteristic indicative signal 80 corresponds to a charging time (indicated as DT in FIG. 7C) of capacitor 52 through resistor 50 for the I/O port 82 voltage to reach predetermined threshold voltage 96.

Figure 5:
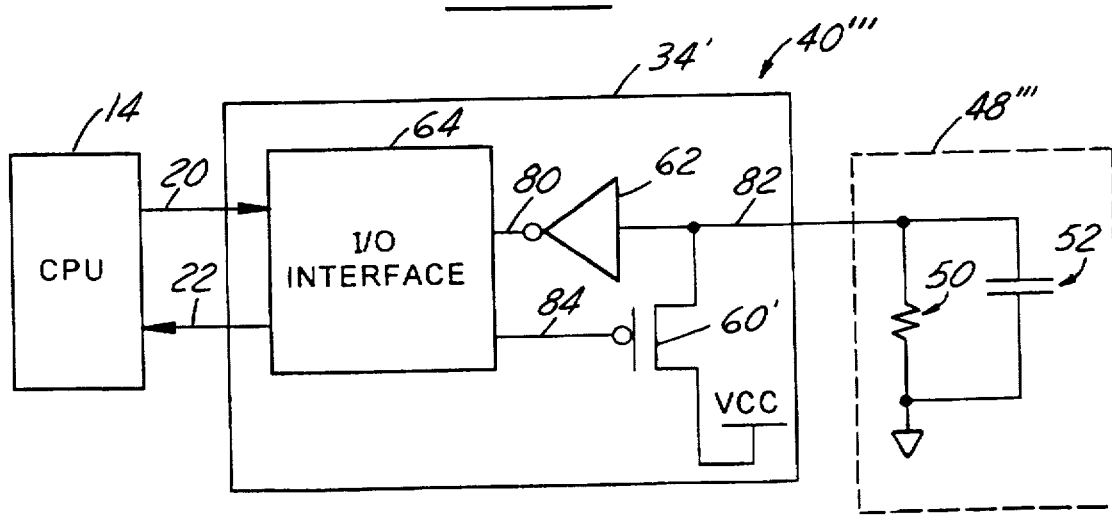
FIG. 5 is a partial schematic and block diagram view depicting a fourth embodiment of the present invention.

Referring now to FIG. 5, a fourth embodiment 40'" having protection device 34', and key 48'" Key 48'" includes resistor 50, and capacitor 52 connected in parallel. The basic operation of apparatus 40'" is identical to that described above. When the control signal 84 is off, PMOS switch 60 is in a non-conductive state. Accordingly, I/O port 82 voltage is pulled to ground through resistor 50, as shown in FIG. 7B. When the control program asserts control signal 84, PMOS switch 60' is placed in a conductive state thus connecting I/O port 82 to Vcc to quickly charge capacitor 52. When control signal 84 is discontinued, capacitor 52 is discharged through resistor 50. When the decreasing voltage appearing an I/O port 82 reaches threshold level 96, comparator 62 changes state, as shown in FIG. 7C. Thus, in the fourth embodiment 40'", the characteristic indicative signal 80 corresponds to a discharging time (DT in FIG. 7B) of capacitor 52 through resistor 50 for the I/O paired voltage to reach threshold 96.

The charging and/or discharging time that is a characteristic of keys 48, 48', 48" and 48'", is directly proportional to the product of the value of resistor 50, and the value of capacitor 50 (R×C). Different keys can be produced to protect the computer software by adjusting the values of the resistor and the capacitor.

Thus, in apparatus 40, 40', 40", and 40'", the method used for protection is the same. While the switch 60 is off, an initial, steady-state charge accumulates on capacitor 52. Switch 60 (or 60') is then turned on to alter the charge on the capacitor 52 from the initial amount to a second amount. This may mean either charging or discharging depending on the embodiment. Next, the charge an capacitor 52 is altered from the second amount back towards the initial amount by turning off switch 60 (or 60'). The time required to reach the predetermined thresholds (either 92 or 96, FIGS. 6B, 7B) is then determined. The thresholds are intermediate the initial and second charge amounts. The program lastly disables use of the protected software using the determined time.

The preceding description is exemplary rather than limiting in nature. A preferred embodiment of this invention has been disclosed to enable one skilled in the art to practice this invention. Variations and modifications are possible without departing from the purview and spirit of this invention; the spirit of which is limited only by the appended claims.

I claim:

1. An apparatus for use in a computer software protection system, comprising:

a key having a preselected one of a plurality of charging and discharging characteristics associated therewith; and protection means coupled to said key and responsive to a control signal from a program for electrically stimulating said key, for detecting said preselected charging and discharging characteristic in response thereto, and for generating a signal indicative of said detected characteristic, said protection means being further for passing said generated characteristic indicative signal to the program wherein the program disables use of the protected computer software, using said characteristic indicative signal, in accordance with predetermined criteria.

2. The apparatus of claim 1 wherein said key includes resistor and a capacitor connected in series, said resistor and capacitor having values selected in accordance with said preselected charging and discharging characteristic, and wherein said protection means includes, an I/O port coupled to said key such that a charge on said capacitor corresponds to a voltage of said I/O port;

a switching device coupled to said I/O port for connecting said I/O port to a ground node to discharge said capacitor, and for disconnecting said I/O port from said ground node to permit charging of said capacitor;

a detection device having an input coupled to said I/O port for detecting a voltage of said I/O port and for generating in response thereto said characteristic indicative signal; and interface means responsive to said control signal for selectively connecting said switching device to said ground node and for passing said characteristic indicative signal to the program.

3. The apparatus of claim 2 wherein said characteristic indicative signal corresponds to a charging time of said capacitor for said I/O port voltage to reach a predetermined threshold voltage.

4. The apparatus of claim 1 wherein said key includes resistor and a capacitor connected in parallel, said resistor and capacitor having values selected in accordance with said preselected charging and discharging characteristic, and wherein said protection means includes, an I/O port coupled to said key such that a charge on said capacitor corresponds to a voltage of said I/O port;

a switching device coupled to said I/O port for connecting said I/O port to a ground node to charge said capacitor, and for disconnecting said I/O port from said ground node to permit discharging of said capacitor;

a detection device having an input coupled to said I/O port for detecting a voltage of said I/O port and for generating in response thereto said characteristic indicative signal; and interface means responsive to said control signal for selectively connecting said switching device to said ground node and for passing said characteristic indicative signal to the program.

5. The apparatus of claim 4 wherein said characteristic indicative signal corresponds to a discharging time of said capacitor for said I/O port voltage to reach a predetermined threshold voltage.

6. The apparatus of claim 1 wherein said key includes resistor and a capacitor connected in series, said resistor and capacitor having values selected in accordance with said preselected charging and discharging characteristic, and wherein said protection means includes, an I/O port coupled to said key such that a charge on said capacitor corresponds to a voltage of said I/O port;

a switching device coupled to said I/O port for connecting said I/O port to a power source to discharge said capacitor, and for disconnecting said I/O port from said power source to permit charging of said capacitor;

a detection device having an input coupled to said I/O port for detecting a voltage of said I/O port and for generating in response thereto said characteristic indicative signal; and interface means responsive to said control signal for selectively connecting said switching device to power source and for passing said characteristic indicative signal to the program.

7. The apparatus of claim 6 wherein said characteristic indicative signal corresponds to a charging time of said capacitor for said I/O port voltage to reach a predetermined threshold voltage.

8. The apparatus of claim 1 wherein said key includes resistor and a capacitor connected in parallel, said resistor and capacitor having values selected in accordance with said preselected charging and discharging characteristic and wherein said protection means includes, an I/O port coupled to said key such that a charge on said capacitor corresponds to a voltage of said I/O port;

a switching device coupled to said I/O port for connecting said I/O port to a power source to charge said capacitor, and for disconnecting said I/O port from said power source to permit discharging of said capacitor;

a detection device having an input coupled to said I/O port for detecting a voltage of said I/O port and for generating in response thereto said characteristic indicative signal; and interface means responsive to said control signal for selectively connecting said switching device to said ground node and for passing said characteristic indicative signal to the program.

9. The apparatus of claim 8 wherein said characteristic indicative signal corresponds to a discharging time of said capacitor for said I/O voltage to reach a predetermined threshold voltage.

10. The apparatus of claim 1 wherein said control signal and said characteristic indicative signal are coupled between the program and said protection means using an address bus and a data bus.

11. The apparatus of claim 1 wherein said characteristic indicative signal is a digital signal having a pulse with a width that corresponds to said preselected charging and discharging characteristic of said key, and wherein said predetermined criteria includes parameter having a value corresponding to said preselected charging and discharging characteristic.

12. A system for protecting computer software, comprising:

a microprocessor configured to execute a control program, said program including means for generating a control signal;

a key having a preselected one of a plurality of charging and discharging characteristics associated therewith; and protection means responsive to said control is coupled to said key for electrically stimulating said key, for said preselected charging and discharging characteristic in response thereto, and for generating a signal indicative of said characteristic, said protection means further having means for said generated characteristic indicative signal to said executing on said microprocessor, said program further including means for disabling use of the protected software using, in accordance with predetermined criteria, said characteristic indicative signal.

13. A method of protecting computer software in a system of the type including a key having a capacitor with an initial charge associated therewith, and a protection device having a switch coupled to the key, comprising the steps of:

(A) altering the charge on the capacitor from the initial amount to a second amount by turning on the switch;

(B) altering the charge on the capacitor from the second amount towards the initial amount by turning off the switch;

(C) determining a time for the charge on the capacitor to reach predetermined threshold level wherein the predetermined threshold level has a value intermediate the initial amount and the second amount;

(D) disabling use of the protected software using the time determined in step (C), in accordance with predetermined criteria.

14. The method of claim 13 wherein step (A) includes the substep of discharging the capacitor to reduce the charge associated therewith, step (B) includes the substep of charging the capacitor to increase the charge associated therewith, the predetermined criteria includes a preselected charging parameter, and wherein step (D) includes the substeps of:

comparing the time determined in step (C) with the preselected charging parameter; and, disabling use of the protected computer software when the time is outside a preselected range of the preselected charging parameter.

15. The method of claim 13 wherein step (A) includes the substep of charging the capacitor to increase the charge associated therewith, step (B) includes the substep of discharging the capacitor to decrease the charge associated therewith, the predetermined criteria includes a preselected discharging parameter, and wherein step (D) includes the substeps of:

comparing the time determined in step (C) with the preselected discharging parameter; and disabling use of the protected computer software when the time is outside a preselected range of the preselected discharging parameter.

* * * * *